Oct. 29, 1929.  A. H. CANDEE  1,733,399
METHOD OF PRODUCING GEARS
Filed Dec. 22, 1926  2 Sheets-Sheet 2
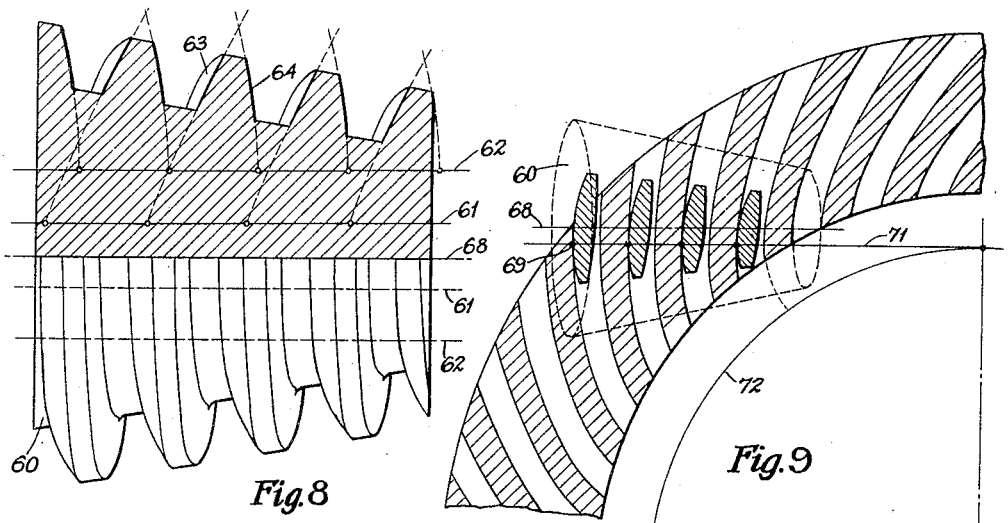
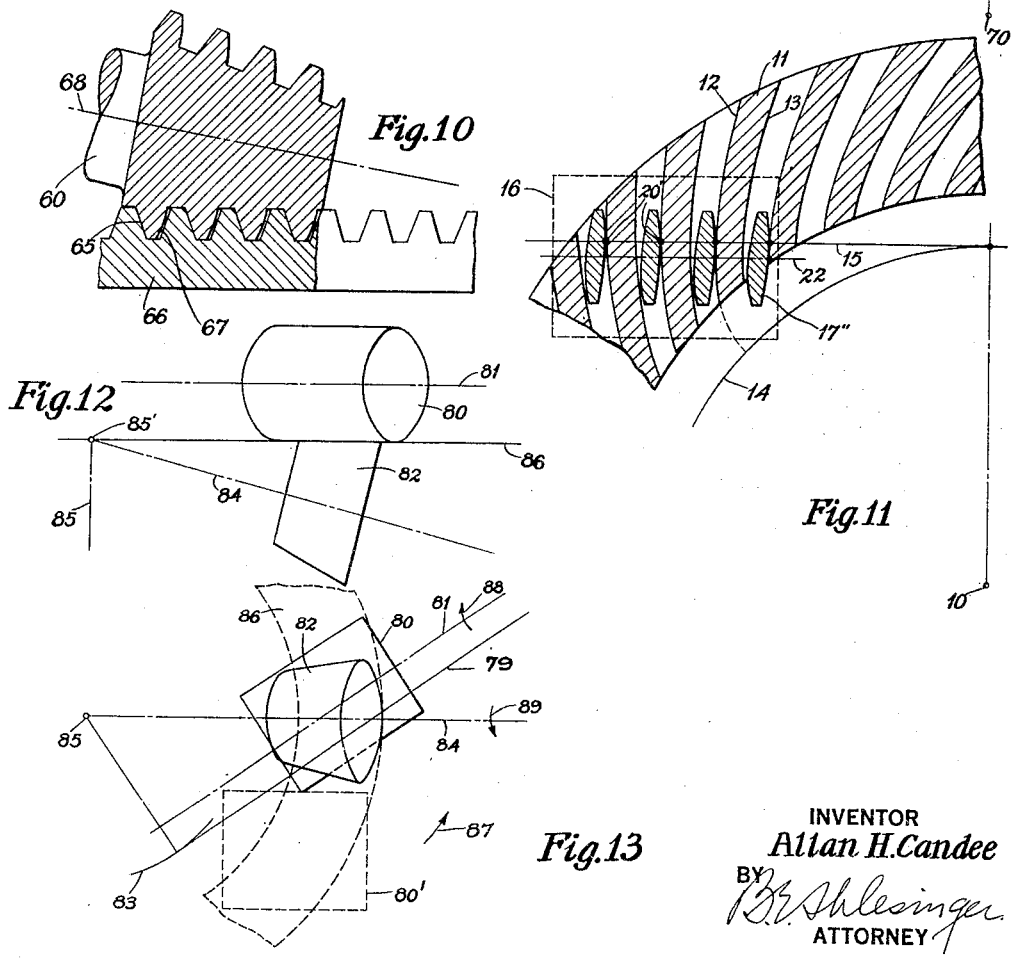
INVENTOR
Allan H. Candee
BY
ATTORNEY Patented Oct. 29, 1929

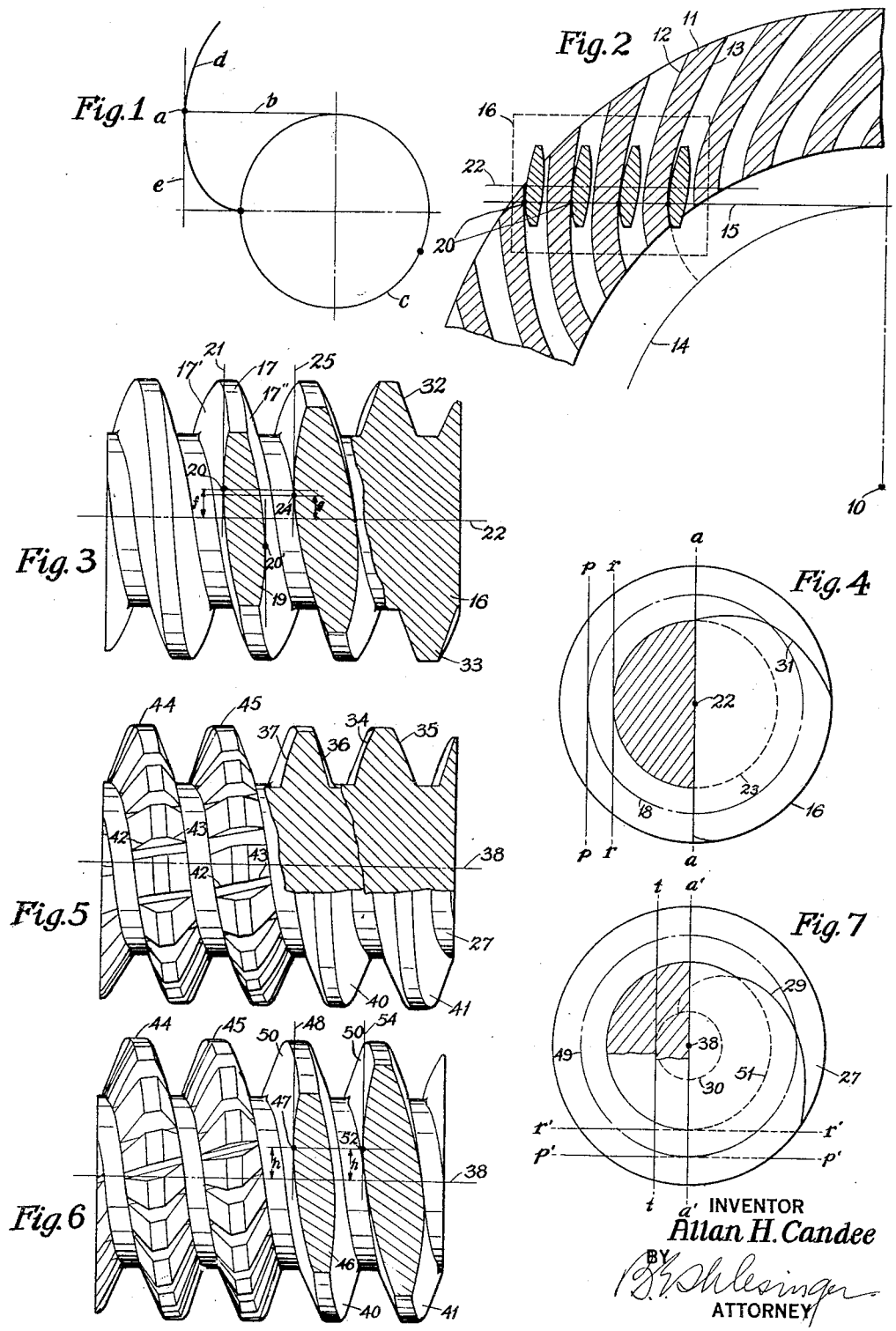

1,733,399

UNITED STATES PATENT OFFICE

ALLAN H. CANDEE, OF ROCHESTER, NEW YORK, ASSIGNOR TO GLEASON WORKS, OF ROCHESTER, NEW YORK, A CORPORATION OF NEW YORK

METHOD OF PRODUCING GEARS

Application filed December 22, 1926. Serial No. 156,387.

The present invention relates to the hobbing of gears and particularly to the hobbing of longitudinally curved tooth tapered gears.

The primary object of the present invention is to provide a method for correctly hobbing tapered gears conjugate to a basic crown gear having teeth curved longitudinally along true involutes of a base circle.

A further object of the present invention is to provide a method whereby a hob of constant pitch of the type commonly used in the hobbing of spur gears may be employed in producing gears conjugate to a basic crown gear which is provided with longitudinally curved teeth which in the pitch plane are involutes of a base circle.

Another object of the present invention is to provide a method of hobbing longitudinally curved tooth tapered gears, where the basic crown gear is provided with longitudinally curved teeth which in the pitch plane and in any other plane parallel thereto are of involute curvature lengthwise.

Other objects of the invention will be apparent hereinafter from the specification and from the recital of the appended claims.

The manner of carrying out my invention is illustrated in the accompanying drawings, in which:

Figure 1 is a diagrammatic view, illustrating the form of an involute curve and its nature;

Figure 2 is a view illustrating diagrammatically the manner in which a cylindrical hob of constant pitch, such as is ordinarily employed in hobbing spur gears, should be positioned to engage the longitudinally concave tooth sides of a crown gear having teeth of involute lengthwise curvature or to produce bevel gears conjugate to this basic crown gear. This view is a sectional plan view through the hob and crown gear taken in the pitch plane or a plane parallel thereto;

Figure 3 is a diagrammatic view of a spur hob of constant pitch, showing the thread prior to being gashed and relieved, and showing sections through this thread in planes tangent to the pitch and root cylinders and in an axial plane, respectively;

Figure 4 is an end view of this hob;

Figure 5 is a side elevation of an involute spur hob, two of the thread convolutions being shown prior to being gashed and relieved in sections taken, respectively, in a plane tangent to the base cylinder and in an axial plane of the hob.

Figure 6 is another view of the same hob, showing sections through the thread convolutions, taken, respectively, in planes tangent to the pitch and root cylinders of the hob;

Figure 7 is an end elevation of the hob shown in Figures 5 and 6;

Figure 8 is a view of a tapered involute hob, prior to being gashed and relieved, the upper part being shown in a section in an axial plane;

Figure 9 is a sectional view in the pitch plane of a crown gear, showing the hob of Figure 8 in engagement with the crown gear;

Figure 10 is a sectional view through taper hob and crown gear taken in a plane tangent simultaneously to a base cylinder of the hob and the base circle of the crown gear;

Figure 11 is a view similar to Figure 2, illustrating the manner in which a hob of constant pitch and specifically a cylindrical hob, may be positioned in engagement with the convex sides of the teeth of an involute crown gear and employed in producing the convex sides of the teeth of a bevel gear conjugate to this basic crown gear;

Figures 12 and 13, are a diagrammatic side elevation and plan view, respectively, showing the method of rolling a hob and gear blank together to produce teeth on the blank conjugate to a basic crown gear, of the type illustrated in Figures 2, 9, 10 and 11.

The principal purpose of this invention, as previously stated, is to hob gears conjugate to a basic crown gear having teeth which extend in involute curves from a base circle.

In describing this invention hereinafter in the specification, reference is made to the production of crown gears. This is done principally because it is much easier to determine the form and position of a hob required for producing a particular bevel gear by analyzing the relationship between the hob and the crown gear which forms the basis of the system.

The principles upon which the present invention is based will be described briefly in a general way first and then reference will be had more particularly to the accompanying drawings in which the manner of carrying out the invention is illustrated.

Crown gears of the type referred to have the characteristic feature that the teeth are of rack section and constant pitch along a line tangent to the base circle from which the curvature of the teeth is derived. Necessarily, therefore, the hob to be employed in cutting such a gear or in cutting a gear conjugate thereto must be of constant pitch in some plane and must be positioned relative to the crown gear so that this plane passes through a line tangent to the base circle of the crown gear. A further essential is that along the line of engagement of the hob and crown gear, the hob thread and the crown gear teeth must have the same direction.

Now, the normal to the side surface of an involute tooth at any point in its length will be tangent to the base circle from which the involute curvature is derived or in other words, the side tooth surfaces of an involute crown gear always cross at right angles a line tangent to the base circle from which the curvature of the teeth is derived. To produce a true involute tooth curve on the crown gear, therefore, the hob thread must not only be of constant pitch along a line tangent to the base circle of the crown gear, but must, also, cross this line at right angles.

In the hobbing of spur gears, a cylindrical hob is ordinarily employed, the threads of which in profile are straight sided and correspond to a section of the common involute rack. A hob of the type referred to is of constant pitch in an axial plane or in any plane parallel thereto. The thread of such a hob is of such structure that in a plane offset from the hob axis, tangents at certain corresponding points in the sides of successive thread convolutions are perpendicular to the hob axis. An ordinary spur hob of constant pitch can be employed, therefore, to produce a crown gear with teeth curved with mathematical exactness along involutes of a base circle or to produce a gear conjugate thereto, when the hob is positioned so that the projection of its axis into the plane of the crown gear is parallel to a line tangent to the base circle of the crown gear and offset from said line by an amount equal to the offset from the hob axis of the points at which the tangents to the sides of the hob threads are perpendicular to the hob axis. So positioned, the hob threads are of constant pitch along a line tangent to the base circle of the crown gear and, like the crown gear teeth, cross at right angles to said tangent.

The points at which the tangents to the thread convolutions are perpendicular to the hob axis are offset on one side of the axis for one side of the hob thread and on the opposite side of the axis for the other side of the thread. Consequently, only one side of the crown gear teeth can be produced theoretically correct with one setting of the hob. The other side of the teeth must be cut either with a hob of opposite hand or with the same hob so positioned that its axis is offset on the opposite side of a tangent to the base circle of the crown gear. The points at which the tangents to the sides of successive thread convolutions are perpendicular to the hob axis are at different distances from the hob axis in different planes, being, for instance, at one distance from the hob axis in a plane tangent to the pitch surface of the hob and at another distance in a plane tangent to the root surface of the hob. Consequently, with a hob of the type described, a true involute curve can be produced in only one plane of the crown gear, this plane depending upon the amount of offset of the hob axis from the line tangent to the base circle of the crown gear. Ordinarily, it will be preferred to position the hob so that it sweeps out true involute curves in the pitch plane of the crown gear. This result will be accomplished when the hob axis is offset from the line tangent to the base circle of the crown gear by an amount equal to the offset from the hob axis, in a plane tangent to the pitch surface, of the points at which the tangents to the sides of successive thread convolutions are perpendicular to the hob axis.

While the ordinary spur hob of constant pitch can produce true involute longitudinal curves in one plane only, I have discovered, that with a cylindrical hob such as described in my Patent No. 1,548,931, of August 11, 1925, or with a tapered hob such as described more particularly hereinafter, it is possible to produce a crown gear whose teeth are of true involute lengthwise curvature in the pitch plane and in all planes parallel thereto.

In each of these hobs, for one side of the thread, the points in the sides of successive thread convolutions, at which the tangents are perpendicular to the hob axis, are offset from the hob axis the same amount in all planes, the amount of offset being equal to the radius of the base cylinder of the hob. Hence, by positioning either of these hobs with the projection of its axis in the plane of the crown gear offset from a line tangent to the base circle of the crown gear, by an amount equal to the radius of the base cylinder of the hob, and imparting the required motions between the hob and crown gear, either of these hobs will produce longitudinal curves upon the surfaces of the teeth of the crown gear which in every plane are true involutes.

The geometrical principles involved in this discovery will be readily understood, now, from the illustrations of the accompanying drawings. Figure 1 illustrates the nature of a true involute curve d which may be regarded as generated by a point a on a string b which is unwound from a base circle or cylinder c. From the very nature of its construction, the straight portion b of the string is always tangent to the base circle c and perpendicular to the curve d. Conversely, the curve d extends, at any instant, in a direction perpendicular to a tangent b to the base circle c. That is, a tangent e to the involute curve d at any point a in the curve crosses at right angles a tangent b to the base circle c from which the curve is derived.

To hob a crown gear, therefore, having teeth which extend in true involute curves from a base circle, one basic requirement is that the hob thread when in proper cutting position crosses at right angles a line tangent to the base circle of the crown gear.

A series of equi-spaced points on the string b will generate similar curves, all of which are parallel to one another. In a crown gear, therefore, having teeth extending in true involute curves from a base circle, the teeth will be of constant pitch along any line tangent to the base circle of the crown gear. A second requirement for hobbing such a gear, therefore, is that the thread of the hob, when in proper cutting position, be of constant pitch along a line tangent to the base circle of the crown gear.

In Figure 2, a fragmentary sectional view of an involute crown gear is shown. This figure may also be considered as showing a bevel gear produced according to this invention since in the plane of development the structure of a bevel gear and of the crown gear from which it is derived are the same. The gear whose axis is at 10 has teeth 11 which have side surfaces 12 and 13 extending in true involute curves from the base circle 14. The teeth are of constant pitch along any straight line, as the line 15, tangent to the base circle 14. This line 15 is also a normal or perpendicular to the tooth curves, as already described with reference to Figure 1. The side surfaces 12 and 13 cross the line 15, therefore, at right angles.

As already stated, to produce the teeth of the crown gear, the hob must be so positioned relative to the crown gear that its threads cross the tangent line 15 at right angles and along this line 15, the hob threads must be of constant pitch.

A hob such as is commonly used in hobbing spur gears is shown in Figures 3 and 4. For the purpose of clearness, the hob is shown as it would appear prior to being gashed and relieved. This hob 16 is of constant pitch in an axial plane or in any plane parallel thereto. A section through one convolution 17 of the hob thread, taken in a plane tangent to the pitch surface 18 of the hob is shown at 19 in Figure 3. This section is on the line p—p of Figure 4. In this plane, at the point 20, offset from the hob axis by a distance f, a tangent 21 to the side 17' of the hob thread convolution 17 is perpendicular to the hob axis 22. For the opposite sides 17'' of the thread convolutions, the points, in this plane, at which the tangents are perpendicular to the hob axis will lie on the opposite side of the axis from the point 20, as indicated at 20'.

By placing the hob 16, therefore, as shown in Figure 2, so that its axis 22 is offset from and parallel to the tangent 15 of the crown gear base circle 14 by an amount equal to the offset of the points 20 in the sides of the hob thread from the hob axis 22, and imparting to the hob and crown gear the required relative movements, tooth surfaces, in this case the longitudinally concave surfaces will be produced on the crown gear which extend in the pitch plane of the crown gear in true involute curves from the base circle 14. The hob thread crosses the line 15 at right angles, tangents to the points 20 on the sides of successive thread convolutions being perpendicular to hob axis 22, and the hob threads are of constant pitch along said line 15. Only one side of the teeth of the crown gear can be cut with exact mathematical accuracy in any one setting of this hob, since the points at which the tangents are perpendicular to the hob axis lie on different sides of the axis for opposite sides of the thread.

The width of the thread convolutions of the hob, therefore, will be made less than the width of the tooth space to be produced on the crown gear and only one side of the thread of the hob will be in finish cutting contact with the tooth sides of the crown gear in any one setting of the hob.

The hob 16, moreover, can only produce true involute curves in one plane, for any particular setting. For in any plane parallel to the plane p—p as the plane r—r, Figure 4, tangent to the root cylinder 23 of the hob, a point 24 at which a tangent 25 to the side of the hob thread is perpendicular to the hob axis 22 will be offset from the hob axis by an amount g slightly different from the offset f of the point 20 from the hob axis. If, then, the hob axis 22 is offset from the tangent 15 by an amount f equal to the amount of offset of the point 20 from the axis 22, the hob will produce true involute curves in the pitch plane of the crown gear. But if the hob axis 22 is offset from the line 15 by an amount g equal to the offset of the point 24 from the axis 22, the hob will produce true involute curves in the root plane of the crown gear. True involute curves can be produced in any other plane by offsetting the hob axis from the line 15 by the amount of offset of the points in that plane, at which the tangents, are perpendicular to the hob axis, but with a hob of the type referred to, at any one setting, true involute curves can be produced in only one plane of the crown gear.

With a hob, such as described, in my Patent No. 1,548,931 above referred to, true involute curves can be produced on the crown gear in every plane. This hob 27 differs in structure from the hob previously described. It has its cutting edges lying in involute helicoidal surfaces, its thread surfaces being generated by a straight line, tangent to a base cylinder, which is simultaneously rotated about the axis of the hob and moved axially. In any plane perpendicular to the axis of a hob of this type, the hod thread extends along a true involute 29 of a base circle 30, whereas the thread of the hob 16 in a plane perpendicular to its axis extends along an Archimedean spiral 31. In an axial plane, the plane $a$—$a$ of Figure 4, the thread of the hob 16 has a profile which is straight and in the form of an ordinary rack tooth, as shown at 32 and 33 in Figure 3, one thread convolution of the hob being shown cut away to the axial plane $a$—$a$ of Figure 4. In a similar section in the plane $a'$—$a'$ of Figure 7, the hob thread 28 is of curved profile on both sides as indicated at 34 and 35 in Figure 5. In a section, however, in a plane $t$—$t$ tangent to the base cylinder 30 of the hob 27, however, one side 36 of the hob thread will be straight and the other side 37 curved. In a plane $t$—$t$ of this hob, therefore, one side of the thread can be matched with the straight sided rack teeth of the crown gear. In a plane tangent to the base cylinder 30 on the opposite sides of the hob axis 38, the side 37 would be straight in profile and the side 36 of curved profile. This hob is of constant pitch in an axial plane or in any plane parallel thereto.

In Figures 5 and 6 two of the thread convolutions 40 and 41 of the hob are shown prior to being gashed and relieved, and two of the thread convolutions 44 and 45 are shown after the thread has been gashed and relieved. The cutting edges 42 and 43 formed by gashing and relieving, lie in helicoidal surfaces conforming to the side surfaces of the original thread. 46 is a section through a thread convolution in a plane $p'$—$p'$ tangent to the pitch cylinder 49 of the hob. In this plane the points 47, at which tangents 48 to the sides 50 of the hob thread are perpendicular to the hob axis 38, are offset from this axis by an amount $h$, equal to the radius of the base cylinder 30 of the hob. In any plane parallel to the pitch plane, as the plane $r'$—$r'$ tangent to the root cylinder 51 of the hob, the point 52 in the sides 50 of the hob thread, at which the tangent 54 is perpendicular to the hob axis 38, will be offset from the hob axis 38 by an amount $h$ equal to the offset $h$ of the point 47 in the pitch plane from the axis 38. In the involute hob, therefore, the points at which the tangents to the sides of the thread are perpendicular to the hob axis are offset from the hob axis by the same amounts in every plane. Therefore, when this hob is positioned relative to the crown gear so that its axis 38 is offset from the line 15 tangent to the base circle 14 of the crown gear by an amount $h$ equal to the radius of the base cylinder of the hob, this hob will produce tooth surfaces on the crown gear which are of true involute lengthwise curvature not only in the pitch plane, but in every plane parallel thereto. This hob, then, really produces a gear whose teeth are of true involute curvature in all planes.

As with the hob 16, with an involute hob only one side of the teeth of the crown gear can be produced in a given setting, as in a given plane tangent to the base cylinder of the hob, only one side of the hob thread is straight in profile and in that plane the tangents to one side of the thread only can be set perpendicular to the hob axis. The other sides of the teeth may be cut with a hob of opposite hand or by setting the same hob so that the projection of its axis into the plane of the crown gear is offset on the opposite side of a tangent to the base circle of the crown gear, as will be more particularly described hereinafter.

The spiral angle of an involute tooth increases rapidly away from the base circle.

In curved tooth gears, it is usually desirable to keep the spiral angle less than 45° to avoid excessive thrusts, so that it is ordinarily desirable to cut the teeth as near to the base circle of the crown gear as possible. For this purpose a taper hob has certain advantages over a cylindrical hob, particularly in cutting the concave sides of the teeth, since the diameter of the taper hob at the small end can be made smaller than the diameter of the cylindrical hob and thus cut the teeth closer to the base circle of the crown gear without interference.

I have devised a form of taper hob which like my cylindrical hob of the true involute type, will produce true involute curves on the side faces of the gear teeth in all planes. This taper hob, like my involute cylindrical hob, has its cutting edges arranged in true involute helicoidal surfaces.

My improved form of taper hob is shown in Figure 8 at 60. For the purpose of clearness, the hob threads are shown prior to being gashed and relieved. In the preferred form, the sides of the threads of the hob 60 can be imagined as being generated by straight lines which rotate about cylinders 61 and 62 of different diameters and which are simultaneously moved at a uniform rate in the direction of the axis of the hob. The sides 63 and 64 of the hob threads are of constant pitch along the axis, but the pitch is different for the two sides.

In the axial plane, the sides of the hob threads are of curved profile, as shown in section in Figure 8, but in a plane tangent to the base cylinder from which it is derived, one side, indicated at 65, of the hob thread will be of straight profile, as shown in Figure 10 and may produce a straight sided profile on the crown gear 66. In this plane tangent to the base cylinder, the opposite sides of the hob thread 67 will be of curved profile. The width of a thread convolution, as with the hobs previously discussed will be less, therefore, than the width of the tooth space to be produced upon the crown gear and only one side of the thread of the hob will be in finish cutting contact with the teeth of the crown gear in any one setting of the hob.

As in the involute cylindrical hob, in the taper hob of the involute type, the points 69 in the corresponding sides of successive thread convolutions, at which tangents are perpendicular to the hob axis 68, will be offset from the hob axis 68 for any one side of the thread in all planes by an amount equal to the radius of a base cylinder of the hob and, therefore, when the hob is so positioned relative to the crown gear that the projection of its axis into the plane of the crown gear is offset from the line 71 tangent to the base circle 72 of the crown gear, by an amount equal to the radius of a base cylinder of the hob, the hob will produce tooth surfaces on corresponding sides of the crown gear which are of involute lengthwise curvature in all planes.

With either the cylindrical or taper hob described, only one side of the teeth of the crown gear can be finish cut in any one setting of the hob. The opposite sides of the teeth of the crown gear may be produced with a hob of opposite hand positioned on the same side of the base circle tangent of the crown gear and offset from said tangent by an amount determined in accordance with the principles already discussed.

It is possible, however, to employ the same hob, whether that be cylindrical or tapered, and cut in successive settings, both sides of the teeth of the crown gear. Figure 11 illustrates how this may be accomplished. In Figure 2 the longitudinally concave sides of the teeth of the crown gear are cut by positioning the hob with its axis 22 offset on one side of the line 15 tangent to the base circle 14 of the crown gear. This offset is determined, as already described, by the amount of offset of the points 20 in the sides of successive thread convolutions from the axis 22. The convex sides 12 of the crown gear teeth can be cut with the same hob 16 by positioning its axis 22 in offset relation on the other side of the line 15. The amount of this offset will be determined by the amount of offset from the hob axis 68 of the points 20' in the side 17" of the hob thread, which is in finish cutting contact with the convex sides 12 of the crown gear teeth, at which the tangents to successive thread convolutions are perpendicular to the hob axis 22. For the usual spur hob of constant pitch, the amount of this offset will be determined from the particular plane in which it is desired to cut true involute curves upon the crown gear. For the ordinary spur hob of constant pitch the amount of offset of the hob axis 22 from the line 15 on opposite sides of the line 15 will be the same for a given plane. In the involute cylindrical hob, such as illustrated in Figures 5 and 6, in cutting opposite sides of the teeth, the hob axis will be offset equal amounts on opposite sides of the tangent 15, equal to the radius of the base cylinder of the hob. When the involute taper hob, such as is illustrated in Figures 8, 9 and 10, is employed, the offset of the axis from the line 15 will be different for different sides of the teeth of the crown gear, corresponding to the difference in the size of the base cylinders 61 and 62 from which the opposite sides of the hob threads are derived.

Figures 12 and 13 show, diagrammatically, the manner of moving a hob and tapered gear blank relatively to each other to produce teeth upon the blank conjugate to the basic crown gear described. The hob 80 shown for the purpose as cylindrical, but which, as will be understood, may be tapered or cylindrical and of the usual form or of the involute type, will be positioned relatively to the blank 82 so that its axis 81 is offset by the determined amount, as already described, from and parallel to a line 79 tangent to the base circle 83 of the crown gear. The blank will be so positioned that its axis 84 intersects the axis 85 of the crown gear 86 and the apex of the blank coincides with the apex or center 85' of the crown gear. The hob and blank are then rotated in engagement about their respective axes and simultaneously a continuous relative movement will be imparted between the hob and blank about the axis 85 of the crown gear, this movement corresponding to that of a gear meshing with the crown gear. In this manner, tooth surfaces will be produced on one side of the teeth of the blank which are conjugate to tooth surfaces on corresponding sides of the teeth of the crown gear. For cutting the opposite sides of the teeth of the blank, the hob position will be changed or a different hob employed, as described above. An initial position of the hob is shown in Figure 13 in dotted lines at 80'. The hob is translated in the direction indicated by the arrow 87, while the arrows 88 and 89 indicate the directions of rotation of the hob and blank respectively.

While I have described my invention in connection with the production of bevel gears specifically, it will be understood that it may be applied, also, to the production of other types of gears, particularly to the production of gears from conical blanks as hypoid gears. In general, while I have illustrated and described certain preferred embodiments of my invention, it will be understood that the invention is capable of further modifications and adaptations within the limits of the disclosure and the scope of the appended claims and that this application is intended to cover any variations, uses or adaptations of my invention, following, in general, the principles of the invention and including such departures from the present disclosure as may come within known or customary practice in the gear art and may be applied to the essential features hereinbefore set forth and as fall within the limits of the appended claims.

Having thus described my invention, what I claim is:

1. The method of cutting the side faces of the teeth of a tapered gear having longitudinally curved teeth, which in development are of constant pitch along a straight line offset from the axis, which consists in positioning a hob which is of constant pitch in an axial plane relatively to the blank so that the projection of the axis of the hob into the plane of development is offset from and parallel to said line of constant pitch and so that the hob thread convolutions have the same direction at said line of constant pitch as have the teeth of the gear to be cut and rotating the hob in intermeshing engagement with the blank while rotating the blank continuously on its axis.

2. The method of cutting the side faces of the teeth of a tapered gear having longitudinally curved teeth, which in development are of constant pitch along a straight line offset from its axis, which consists in positioning a hob which is of constant pitch in an axial plane relative to the blank so that the projection of the axis of the hob into the plane of development is offset from and parallel to said line of constant pitch and so that the hob thread convolutions have the same direction at said line of constant pitch as have the teeth of the gear to be cut and rotating said hob in intermeshing engagement with the blank while rotating the blank continuously on its axis and simultaneously producing a continuous relative rolling movement between the hob and blank.

3. The method of cutting the side faces of the teeth of a gear conjugate to a basic crown gear having longitudinally curved teeth which are of constant pitch along a straight line offset from its axis, which consists in selecting a hob of constant pitch and positioning the hob so that the projection of its axis into the plane of the crown gear is offset from and parallel to said line of constant pitch of the crown gear and that the thread convolutions of the hob have the same direction at said line of constant pitch as have the teeth of the crown gear, and rotating said hob in continuous intermeshing engagement with the blank while rotating the blank continuously on its axis and simultaneously imparting a continuous relative rolling movement between the hob and blank corresponding to that of a gear meshing with the crown gear.

4. The method of cutting the side faces of the teeth of a tapered gear having longitudinally curved teeth which in development are of constant pitch along a straight line offset from its axis, which consists in positioning a hob having threads of constant pitch relatively to the gear blank so that, in the plane of the development, the points in the sides of the successive thread convolutions at which the tangents are perpendicular to the hob axis, lie on said line of constant pitch, and rotating said hob in intermeshing engagement with the gear blank while rotating the blank continuously on its axis.

5. The method of cutting the side faces of the teeth of a tapered gear having longitudinally curved teeth which in development are of constant pitch along a straight line offset from its axis, which consists in positioning a hob, having threads of constant pitch relatively to the gear blank so that, in the plane of the development, the points in the sides of successive thread convolutions at which the tangents are perpendicular to the hob axis, lie on said line of constant pitch, and rotating said hob in intermeshing engagement with the blank while rotating the blank continuously on its axis and simultaneously producing a continuous relative rolling movement between the hob and blank.

6. The method of cutting the side faces of the teeth of a gear conjugate to a basic crown gear having longitudinally curved teeth which are of constant pitch along a straight line offset from its axis, which consists in selecting a hob, having threads of constant pitch, and positioning said hob relative to the blank so that the points in the sides of successive thread convolutions, at which the tangents are perpendicular to the hob axis, lie on said line of constant pitch, and rotating said hob in continuous intermeshing engagement with the blank while rotating the blank continuously on its axis and simultaneously imparting the continuous relative rolling movement between the hob and blank in a manner of a gear meshing with the crown gear.

7. The method of cutting the side faces of the teeth of a gear conjugate to a basic crown gear whose teeth extend in involute curves from a base circle, which consists in selecting a hob, having threads of constant pitch, and positioning said hob so that the points in the sides of successive thread convolutions, at which tangents are perpendicular to the hob axis, lie on a tangent to the base circle from which the longitudinal curvature of the crown gear teeth are derived, and rotating the hob in intermeshing engagement with the blank while rotating the blank continuously on its axis and simultaneously imparting a continuous relative rolling movement between the hob and blank corresponding to that of a gear meshing with the crown gear.

8. The method of cutting the side faces of the teeth of a longitudinally curved tooth tapered gear which in development is of constant pitch along a straight line offset from its axis, which consists in positioning a hob of constant pitch relatively to the gear blank so that, in the plane of the development, the axis of the hob is offset from and parallel to said line of constant pitch and so that points in the sides of successive thread convolutions, at which tangents are perpendicular to the hob axis, lie on said line of constant pitch and rotating the hob in intermeshing engagement with the blank while rotating the blank continuously on its axis.

9. The method of cutting the side faces of the teeth of a longitudinally curved tooth tapered gear which in development is of constant pitch along a straight line offset from the axis, which consists in positioning a hob of constant pitch relative to the gear blank so that the projection of the hob axis in the plane of the development is offset from and parallel to said line of constant pitch and so that the points in the sides of successive thread convolutions at which the tangents are perpendicular to the hob axis, lie on said line of constant pitch, and rotating the hob in intermeshing engagement with the blank while rotating the blank continuously on its axis and simultaneously producing a continuous relative rolling movement between the hob and blank.

10. The method of cutting the side faces of the teeth of a gear which is conjugate to a basic crown gear having longitudinally curved teeth which are of constant pitch along a straight line offset from the axis, which consists in positioning a hob of constant pitch relative to the gear blank so that the projection of the hob axis into the plane of the crown gear is offset from and parallel to said line of constant pitch of the crown gear and that the points in the sides of successive thread convolutions, at which the tangents are perpendicular to the hob axis, lie on said line of constant pitch and rotating the hob in continuous intermeshing engagement with the blank while rotating the blank continuously on its axis and simultaneously imparting a continuous relative rolling movement between the hob and blank corresponding to that of a gear meshing with the crown gear.

11. The method of cutting the side faces of the teeth of a gear conjugate to a basic crown gear having teeth extending in involute curves from a base circle which consists in positioning a hob of constant pitch relative to a gear blank so that the projection of the hob axis into the plane of the crown gear is offset from and parallel to a line tangent to said base circle and that the points in the sides of the successive thread convolutions, at which the tangents are perpendicular to the hob axis, lie on said tagent to the base circle, and rotating said hob in intermeshing engagement with the blank, while rotating the blank continuously on its axis and simultaneously producing a continuous relative rolling movement between the hob and blank corresponding to that of a gear meshing with the crown gear.

12. The method of cutting the side faces of the teeth of a longitudinally curved tooth tapered gear which in development is of constant pitch along a straight line offset from the axis which consists in positioning a taper hob of constant pitch in an axial plane relative to the gear blank so that the projection of the hob axis in the plane of the development is offset from and parallel to said line of constant pitch and so that the thread convolutions of the hob have the same direction at said line of constant pitch as have the teeth of the gear to be cut and rotating said hob in intermeshing engagement with the blank while rotating the blank continuously on its axis.

13. The method of cutting the side faces of the teeth of a longitudinally curved tooth tapered gear which in development is of constant pitch along a straight line offset from its axis which consists in positioning a taper hob of constant pitch in an axial plane relative to the gear blank, so that the projection of the hob axis into the plane of the development is offset from and parallel to said line of constant pitch and so that the thread convolutions of the hob have the same direction at said line of constant pitch as have the teeth of the gear to be cut, and rotating said hob in intermeshing engagement with the gear blank while rotating the blank continuously on its axis and simultaneously producing a continuous relative rolling movement between the hob and blank.

14. The method of cutting the side faces of the teeth of a longitudinally curved tooth tapered gear which in development is of constant pitch along a straight line offset from the axis which consists in positioning a taper hob of constant pitch relative to a gear blank so that the projection of the hob axis in the plane of the development is offset from and parallel to said line of constant pitch and so that the points in the sides of successive thread convolutions, at which the tangents are perpendicular to the hob axis, lie on said line of constant pitch, and rotating said hob in intermeshing engagement with the gear blank while rotating the blank continuously on its axis.

15. The method of cutting the side faces of the teeth of a longitudinally curved tooth tapered gear which in development is of constant pitch along a straight line offset from its axis which consists in positioning a taper hob of constant pitch relative to a gear blank so that the projection of the hob axis into the plane of the development, is offset from and parallel to said line of constant pitch and so that the points in the sides of successive thread convolutions at which the tangents are perpendicular to the hob axis, lie on said line of constant pitch, and rotating said hob in intermeshing engagement with the gear blank while rotating the blank continuously on its axis and simultaneously imparting a continuous relative rolling motion between the hob and blank.

16. The method of cutting the side faces of a gear conjugate to a basic crown gear having teeth extending in involute curves from a base circle, which consists in positioning a taper hob of constant pitch relative to the gear blank so that the projection of the hob axis into the plane of the crown gear is offset from and parallel to a line tangent to said base circle and that the points in the sides of successive thread convolutions, at which the tangents are perpendicular to the hob axis, lie on said tangent to the base circle and rotating said hob in intermeshing engagement with the gear blank while rotating the blank continuously on its axis and simultaneously producing a continuous relative rolling movement between the hob and blank corresponding to that of a gear meshing with the crown gear.

17. The method of cutting the side faces of a longitudinally curved tooth tapered gear which consists in positioning a hob, having its cutting edges lying in an involute helicoidal surface, with its axis offset from the axis of the blank to be cut and in rotating said hob in continuous intermeshing engagement with the gear blank while rotating the blank continuously on its axis.

18. The method of cutting the side faces of a longitudinally curved tooth tapered gear which consists in positioning a hob, having its cutting edges lying in involute helicoidal surfaces, with its axis offset from the axis of the blank to be cut and in rotating said hob and the gear blank continuously on their respective axes in intermeshing engagement while simultaneously imparting a continuous relative rolling movement between the hob and blank.

19. The method of cutting the side faces of a longitudinally curved tooth tapered gear which consists in positioning a hob, having its cutting edges lying in involute helicoidal surfaces, with its axis offset from the axis of the gear blank to be cut and in rotating said hob and blank continuously on their respective axes in intermeshing engagement, while simultaneously imparting a relative rolling movement between the hob and blank corresponding to that of a gear meshing with a crown gear.

20. The method of cutting the side tooth faces of a longitudinally curved tooth tapered gear which in development is of constant pitch along a straight line offset from the axis, which consists in positioning a hob, having its cutting edges lying in involute helicoidal surfaces, relative to the gear blank, so that the projection of the hob axis in the plane of the development is offset from said line of constant pitch by an amount equal to the radius of the base cylinder of the hob and rotating said hob in intermeshing engagement with the gear blank while rotating the blank continuously on its axis.

21. The method of cutting the side tooth faces of a gear which is conjugate to a basic crown gear whose teeth extend in involute curves from a base circle, which consists in positioning a hob, having its cutting edges lying in involute helicoidal surfaces, relative to the gear blank so that the projection of the hob axis into the plane of the crown gear is offset, by an amount equal to the radius of the base cylinder of the hob, from a line tangent to the base circle of the crown gear, and rotating said hob in continuous intermeshing engagement with the gear blank while rotating the blank continuously on its axis and simultaneously producing a continuous relative rolling movement between the hob and blank corresponding to that of a gear meshing with the crown gear.

22. The method of cutting the side tooth faces of a longitudinally curved tooth tapered gear which in development is of constant pitch along a straight line offset from its axis, which consists in positioning a taper hob, having its cutting edges lying in involute helicoidal surfaces relative to the gear blank so that a plane tangent to the base cylinder of the hob and perpendicular to the plane of the development passes through said line of constant pitch and rotating said hob in intermeshing engagement with the gear blank while rotating the blank continuously on its axis.

23. The method of cutting the side tooth faces of a gear which is conjugate to a basic crown gear whose teeth extend in involute curves from a base circle which consists in positioning a taper hob, having its cutting edges lying in involute helicoidal surfaces, relative to the gear blank so that a plane tangent to the base cylinder of the hob and parallel to the axis of the crown gear passes through said line of constant pitch and rotating said hob in intermeshing engagement with the gear blank while rotating the blank continuously on its axis and simultaneously producing a continuous relative rolling movement between the hob and blank corresponding to that of a gear meshing with a crown gear.

24. The method of cutting a longitudinally curved tooth tapered gear which in development is of constant pitch along a straight line offset from its axis which consists in cutting corresponding sides of all the teeth of the blank with a hob of constant pitch, so positioned relative to the blank that the projection of its axis into the plane of the development is offset to one side of the line of constant pitch, and cutting the opposite sides of the teeth of the blank with the same hob so positioned that its axis is offset on the other side of the line of constant pitch, the hob being rotated, during each cutting operation, in continuous intermeshing engagement with the blank while the blank is rotated continuously on its axis.

25. The method of cutting a gear conjugate to a crown gear whose teeth extend in involute curves from a base circle, which consists in cutting corresponding sides of all the teeth of the blank with a hob of constant pitch so positioned relative to the blank that the projection of its axis into the plane of the crown gear is offset to one side of a line tangent to said base circle, and cutting the opposite sides of the teeth of the blank with the same hob so positioned that the projection of its axis is offset to the other side of the tangent to said base circle, the hob being rotated during each cutting operation in continuous intermeshing engagement with the gear blank while the blank is rotated continuously on its axis and a continuous relative rolling movement is simultaneously imparted between the hob and blank corresponding to that of a gear meshing with the crown gear.

26. The method of cutting a longitudinally curved tooth tapered gear which is of constant pitch in development along a straight line offset from the axis, which consists in cutting corresponding sides of all the teeth of the blank with a hob of constant pitch so positioned relative to the blank that the projection of its axis into the plane of the development is offset from and parallel to said line of constant pitch and that the points in the sides of successive thread convolutions, at which the tangents are perpendicular to the hob axis, lie on said line of constant pitch, and cutting the opposite sides of the teeth of the blank with the same hob so positioned that the projection of its axis is offset from the opposite side of said line of constant pitch and that the points on the sides of successive thread convolutions, at which the tangents are perpendicular to the hob axis, lie on said line of constant pitch, the hob being rotated, during each cutting operation, in intermeshing engagement with the gear blank while the blank is rotated continuously on its axis.

27. The method of cutting a gear conjugate to a crown gear having teeth extending in involute curves from a base circle, which consists in cutting corresponding sides of all the teeth of the blank with a hob of constant pitch, so positioned that the projection of its axis into the plane of the crown gear is offset from and parallel to a tangent to said base circle and that the points in the sides of successive thread convolutions, at which the tangents are perpendicular to the hob axis, lie on said tangent to the base circle of the crown gear, and cutting the opposite sides of the teeth of the blank with the same hob so positioned that the projection of its axis is offset on the opposite side of the tangent to the base circle and that the points in the sides of successive thread convolutions, at which the tangents are perpendicular to the hob axis, lie on said line tangent to the base circle, the hob being rotated, during each cutting operation, in intermeshing engagement with the gear blank while the blank is rotated continuously on its axis and while simultaneously a continuous relative rolling movement is imparted between the hob and blank corresponding to that of a gear meshing with the crown gear.

28. The method of cutting a longitudinally curved tooth tapered gear which is of constant pitch in development along a straight line offset from its axis, which consists in cutting corresponding sides of all the teeth of the blank with a taper hob of constant plane so positioned relative to the blank that the projection of its axis in the pitch of the development is offset from and parallel to said line of constant pitch and that the points in the sides of successive thread convolutions, at which the tangents are perpendicular to the hob axis, lie on said line of constant pitch, and cutting the opposite sides of the teeth of the blank with the same hob so positioned that the projection of its axis is offset from the opposite side of said line of constant pitch and the points in the sides of successive thread convolutions, at which the tangents are perpendicular to the hob axis, lie on said line of constant pitch, the hob being rotated, during each cutting operation, in intermeshing engagement with the gear blank while the blank is continuously rotated on its axis.

29. The method of cutting a gear conjugate to a crown gear having teeth extending in involute curves from a base circle, which consists in cutting corresponding sides of all the teeth of the blank with a taper hob of constant pitch, so positioned relative to the blank that the projection of the hob axis into the plane of the crown gear is offset from and parallel to a tangent to the base circle of the crown gear and that the points in the sides of successive thread convolutions, at which the tangents are perpendicular to the hob axis, lie on said tangent to the base circle of the crown gear, and cutting the opposite sides of the teeth of the blank with the same hob so positioned that the projection of its axis is offset on the opposite side of the tangent to the base circle and that the points in the sides of successive thread convolutions, at which the tangents are perpendicular to the hob axis, lie on said tangent to the base circle, the hob being rotated, during each cutting operation, in intermeshing engagement with the gear blank while the blank is rotated continuously on its axis and while simultaneously a continuous relative rolling movement is imparted between the hob and blank corresponding to that of a gear meshing with the crown gear.

30. The method of cutting a longitudinally curved tooth tapered gear which in development is of constant pitch along a straight line offset from its axis, which consists in cutting corresponding sides of all the teeth of the blank with a hob, having its cutting edges lying in involute helicoidal surfaces, so positioned relative to the gear blank that one side of the hob thread is in finish cutting contact with one side of the teeth of the gear and that the projection of the hob axis in the plane of the development is offset from said line of constant pitch, by an amount equal to the radius of the base cylinder of the hob, and cutting the opposite sides of the teeth of the blank with the same hob so positioned that the opposite side of its thread is in finish cutting contact with the other side of the teeth of the blank and with the projection of its axis offset on the opposite side of said line of constant pitch by an amount equal to the radius of its base cylinder, the hob being rotated during each cutting operation, in continuous engagement with the blank while the blank is rotated continuously on its axis.

31. The method of cutting a gear conjugate to a basic crown gear whose teeth extend in involute curves from a base circle, which consists in cutting corresponding sides of all the teeth of the blank with a hob, having its cutting edges lying in involute helicoidal surfaces, so positioned relative to the gear blank that one side of its thread is in finish cutting contact with one side of the teeth of the gear and that a plane tangent to the base cylinder of the hob on one side of its axis and parallel to the axis of the crown gear passes through a tangent to the base circle of the crown gear, and cutting the opposite sides of the teeth of the blank with the same hob so positioned that the opposite side of its thread is in finish cutting contact with the other side of the teeth of the blank and that a plane tangent to the base cylinder of the hob on the opposite side of the hob axis and parallel to the axis of the crown gear passes through the tangent to the base circle of the crown gear, the hob being rotated, during each cutting operation, in intermeshing engagement with the blank while the blank is rotated continuously on its axis and while simultaneously a continuous relative rolling movement is imparted between the hob and blank corresponding to that of a gear meshing with a crown gear.

32. The method of cutting a longitudinally curved tooth tapered gear which in development is of constant pitch along a straight line offset from its axis which consists in cutting corresponding sides of all the teeth of the blank with a taper hob, having its cutting edges lying in involute helicoidal surfaces, so positioned relative to the gear blank that one side of its thread is in finish cutting contact with one side of the teeth of the blank and that a plane tangent to the base cylinder from which this side of the hob thread is derived passes through the line of constant pitch, and cutting the opposite sides of the teeth of the blank with the same hob so positioned that the opposite side of its thread is in finish cutting contact with the other sides of the teeth of the blank and that a plane tangent to the base cylinder from which the last named side of the hob thread is derived passes through a line of constant pitch of the gear in development, the hob being rotated during each cutting operation, in intermeshing engagement with the gear blank while the blank is rotated continuously on its axis.

33. The method of cutting a gear conjugate to a basic crown gear whose teeth extend in involute curves from a base circle, which consists in cutting corresponding sides of all the teeth of the blank with a taper hob, having its cutting edges lying in involute helicoidal surfaces, so positioned relative to the gear blank that one side of the thread is in finish cutting contact with one side of the teeth of the gear blank and that a plane parallel to the axis of the crown gear and tangent to the base cylinder from which this side of the hob thread is derived passes through a line tangent to the base circle of the crown gear, and cutting the opposite sides of the teeth of the blank with the same hob so positioned that the opposite side of its thread is in finish cutting contact with the other side of the teeth of the gear and that a plane parallel to the axis of the crown gear and tangent to the base cylinder from which the last named side of the hob thread is derived passes through a tangent to the base circle of the crown gear, the hob being rotated, during each cutting operation, in intermeshing engagement with the blank while the blank is rotated continuously on its axis and while simultaneously a continuous relative rolling movement is imparted between the hob and blank corresponding to that of a gear meshing with the crown gear.

34. The method of cutting the side faces of the teeth of a longitudinally curved tooth gear which in development is of constant pitch along a straight line offset from its axis, which consists in positioning a hob relative to a gear blank so that in a plane perpendicular to the plane of the development and passing through said line of constant pitch, the hob thread is also of constant pitch and so that the tangents to the sides of successive thread convolutions at the points of intersection of said thread convolutions with said line are perpendicular to said line, and rotating said hob in intermeshing engagement with the gear blank while rotating the blank continuously on its axis.

35. The method of cutting the side faces of the teeth of a gear conjugate to a basic crown gear having teeth extending in involute curves from a base circle, which consists in positioning a hob relative to the gear blank so that in a plane parallel to the crown gear axis and passing through a line tangent to said base circle, the hob is also of constant pitch and so that the tangents to the sides of successive thread convolutions at the points of intersection of said thread convolutions with said tangent line are perpendicular to said line, and rotating the hob in intermeshing engagement with the gear blank while rotating the blank continuously on its axis and simultaneously producing a relative rolling movement between the hob and blank corresponding to that of a gear meshing with the crown gear.

ALLAN H. CANDEE.